(12) United States Patent
Feight et al.

(10) Patent No.: US 10,979,144 B1
(45) Date of Patent: Apr. 13, 2021

(54) OPTICAL DOMAIN CONTROLLER OF A TELECOMMUNICATIONS NETWORK

(71) Applicant: Level 3 Communications, LLC, Broomfield, CO (US)

(72) Inventors: William Feight, Bennett, CO (US); Tara Joseph-Labrie, Centennial, CO (US); James M. Adkins, III, Bennett, CO (US); Clyde David Cooper, III, Louisville, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/798,184

(22) Filed: Feb. 21, 2020

Related U.S. Application Data

(60) Provisional application No. 62/915,587, filed on Oct. 15, 2019, provisional application No. 62/948,706, filed on Dec. 16, 2019.

(51) Int. Cl.
*H04B 10/27* (2013.01)
*H04B 10/00* (2013.01)
*H04B 10/25* (2013.01)

(52) U.S. Cl.
CPC ............. *H04B 10/27* (2013.01); *H04B 10/00* (2013.01); *H04B 10/25* (2013.01)

(58) Field of Classification Search
None
See application file for complete search history.

(56) References Cited

U.S. PATENT DOCUMENTS

| | | | | |
|---|---|---|---|---|
| 4,723,309 A | * | 2/1988 | Mochizuki | H04B 10/27 398/101 |
| 6,970,481 B2 | * | 11/2005 | Gray, III | H04L 12/66 370/252 |
| 2003/0115482 A1 | * | 6/2003 | Takihiro | H04L 63/0227 726/9 |
| 2007/0067424 A1 | * | 3/2007 | Raciborski | H04L 67/1023 709/223 |
| 2008/0270673 A1 | * | 10/2008 | Sridhar | H04L 12/2879 711/6 |
| 2015/0124615 A1 | * | 5/2015 | Spector | H04L 43/0882 370/235 |

* cited by examiner

*Primary Examiner* — Darren E Wolf (57) ABSTRACT

Implementations described and claimed herein provide systems and methods for an optical domain controller for managing and maintaining a record of network component configuration and interconnections. The optical domain controller detects changes in a configuration of optical network elements in response to a requested service from the network, coordinates additional changes in configurations to optical network elements that may be affected by the detected change, communicates with the optical network elements to incorporate the changes to the configurations of the network element, and stores the configurations and states of the network elements. The use of the optical domain controller may thus replace or supplement a database storing network configuration information by automatically managing changes to the network as new services are instantiated directly on the optical network elements.

18 Claims, 5 Drawing Sheets

OPTICAL DOMAIN CONTROLLER OF A TELECOMMUNICATIONS NETWORK

CROSS-REFERENCE TO RELATED APPLICATIONS

This application is related to and claims priority under 35 U.S.C. § 119(e) from U.S. Patent Application No. 62/915,587, filed Oct. 15, 2019 entitled "OPTICAL PEERING FABRIC IN A TELECOMMUNICATIONS NETWORK" and from U.S. Patent Application No. 62/948,706, filed Dec. 16, 2019 entitled "OPTICAL DOMAIN CONTROLLER OF A TELECOMMUNICATIONS NETWORK," which are hereby incorporated by reference in their entirety for all purposes.

TECHNICAL FIELD

Embodiments of the present disclosure generally relate to systems and methods for implementing a telecommunications or data network, and more specifically for an optical domain controller of the telecommunications or data network that detects changes in a configuration of an optical network element, coordinates additional changes in configurations to one or more optical network elements, and communicates with the one or more optical network elements to incorporate the changes to the configurations.

BACKGROUND

Telecommunication networks provide, among other functions, connections between clients of the network and various possible remote services including compute, network, and storage often provided by a cloud service provider. For example, the telecommunication network may provide one or more clients access to a cloud computing network where the client can obtain some cloud service. In another example, the telecommunication network may provide large capacity connections between client networks, such as a 100 gigabyte per second (Gbps) (or more) optical fiber connection between different networks of the same client such as might occur when a company has geographically separated facilities. To provide such optical connection services, telecommunication networks may include multiple optical network devices or elements that are interconnected based on requests for connection services. For example, a backbone network may connect to a first client network via a first optical network device (ND) in a first geographic location while a second client network may connect to the backbone network at a second optical ND in a second geographical location. To interconnect the first and second client networks, optical NDs within the backbone network may be configured to create a transmission path between the first ND and the second ND, thereby generating a connection path between the two client networks.

Many networks include off-line databases to store network configurations for managing the various interconnections and configurations of NDs within the communication network. As NDs of the network are configured to provide the connections, one or more databases of the network may be updated with the new configuration such that the network operating systems may have access to a current network configuration. For example, network configuration systems may verify requests for providing a new service with the information stored in the network configuration databases to determine the changes used to configure the NDs to provide the requested service. However, it is often the case that the network configuration information stored in the network configuration databases does not accurately reflect a current state or configuration of the network. For example, many networks rely on technicians to manually update the network databases after new ND configurations are implemented in the network, which updates may not happen in a timely manner, if at all, due to various reasons. Other NDs may operate dynamically in response to network configuration changes such that the configuration of some NDs (such as port assignment, interconnections, or other logical aspects of the NDs) may be changed automatically in response to network conditions. Network databases may not receive these automatic configuration changes such that the databases do not include accurate network configuration information. Inaccurate network configuration databases may result in conflicts when providing requested services, which may lead to loss of network traffic or other negative effects.

It is with these observations in mind, among others, that aspects of the present disclosure were conceived.

SUMMARY

One implementation of the present disclosure may take the form of a system for managing a network. The system may include a controller, referred to herein as an optical domain controller, in communication with a plurality of optical devices of an optical network. The optical domain controller may receive, from a first optical device of the plurality of optical devices and in response to a request for an optical connection service, a notification of a configuration change to a component of the first optical device, obtain, from a network infrastructure database, an identification of a component of a second optical device associated with the configuration change to the first optical device, and transmit, to the second optical device, a configuration instruction to configure the component of the second optical device based on the notification of the configuration change to the first optical device.

Another implementation of the present disclosure may take the form of a method for managing a network. The method may include the operations of receiving, at an optical domain controller of an optical network, a configuration change notification from a first optical device of the optical network, the configuration change notification based on a request for an optical connection service of a first network to a second network via the optical network and accessing a network infrastructure database storing configuration information of the optical network to determine a network component associated with the configuration change to the first optical device, the network component separate from the first optical device. The method may further include the operations of generating a configuration instruction to configure the network component based on the configuration change notification from the first optical device and transmitting, to an activation controller associated with the network component, the configuration instruction.

Yet another implementation of the present disclosure may take the form of an optical domain controller of an optical network comprising a communication port communicating with a database of configurations of an optical network, a processor in communication with the communication port to receive configurations of an optical network, and a non-transitory memory comprising instructions encoded thereon. The instructions, when executed by the processor, are operable to receive configuration change notification from a first optical network device of the optical network, the configuration change notification based on a request for an optical connection service of a first network to a second network via the optical network, determine, based on the received configurations of an optical network, a network component associated with the configuration change to the first optical network device, the network component separate from the first optical network device, and transmit, to a second optical network device associated with the network component, a configuration instruction to configure the network component based on the configuration change notification from the first optical network device.

While multiple embodiments are disclosed, still other embodiments of the present disclosure will become apparent to those skilled in the art from the following detailed description, which shows and describes illustrative embodiments of the disclosure. As will be realized, the invention is capable of modifications in various aspects, all without departing from the spirit and scope of the present disclosure. Accordingly, the drawings and detailed description are to be regarded as illustrative in nature and not restrictive.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Aspects of the present disclosure include systems, methods, networking devices, and the like, which may involve an optical domain controller, for managing and maintaining a record of network component configuration and interconnections. In one instance, the optical domain controller may detect changes in a configuration of one or more network elements, in response to a requested service from the network, coordinate additional changes in configurations to one or more network elements or components of network devices that may be affected by the detected change, communicate with the one or more network devices to incorporate the changes to the configurations of the network element or component, and store the configurations and states of the network elements. The use of the optical domain controller may thus replace or supplement a database storing network configuration information by automatically managing changes to the network as new services are instantiated directly on the network devices. In one example, the optical domain controller may communicate with multiple network devices of the data network to receive and maintain a network-wide interconnection and network element information database of the current status of the data network while being responsive to automatic or client-requested configuration changes to the operating status of the network.

In one instance, the optical domain controller may have a client relationship with one or more optical network elements (NEs) of the communication or data network. It should be noted that the term optical network element or network element as used herein is simply meant to refer to a network element or device that is involved in optical communications. The one or more NEs may self-report requested changes to components or configurations of the NEs, including but not limited to interconnections with other components, changes in operational states of ports or interfaces of the NEs, activation or deactivation of components of the NEs, and the like. The changes in the configurations of the NEs may occur in response to a request for providing a service to a client of the data network, such as an interconnection of the client network to another client network. In response to the self-reported change, the optical domain controller may determine a communication path for the reporting NE and the components of the NE that may be affected or altered by the configuration change. The optical domain controller may communicate with the identified components of the NE to determine a state or configuration of the components and, in some instances, generate and transmit one or more configuration instructions to the identified components to adjust a configuration or state according to the requested service.

In addition, the optical domain controller may also communicate and/or configure optical NEs executing differing operating systems (OS) or using different communication formats. For example, a first optical NE of the network may use a first format for instructions and/or commands to configure the components of the first NE while a second optical NE of the network may use a second format, different than the first format, for instructions and/or commands to configure the components of the first NE. To communicate with and/or configure the first optical NE and the second optical NE, the optical domain controller may include an abstraction layer to translate common instructions or commands into specific communication formats or languages associated with the NEs of the network. The abstraction layer may be used to translate reports or other information received from the client NEs and, if configuration instructions or other communications are generated to alter the configuration of the client NEs, translate the instructions into the communication format of the intended optical NE. The abstraction layer may therefore include one or more translation tables that map networking device-specific commands and instructions to a common language common structure for each optical NE of the network reporting to the optical domain controller. Routing logic or other operational methods of the optical domain controller may be executed on the common structure for instructions and commands and translated back into the device-specific commands and instructions for transmission to the client optical NEs. In this manner, the optical domain controller may control and manage varying types of optical networking devices of the data network.

Figure 1:
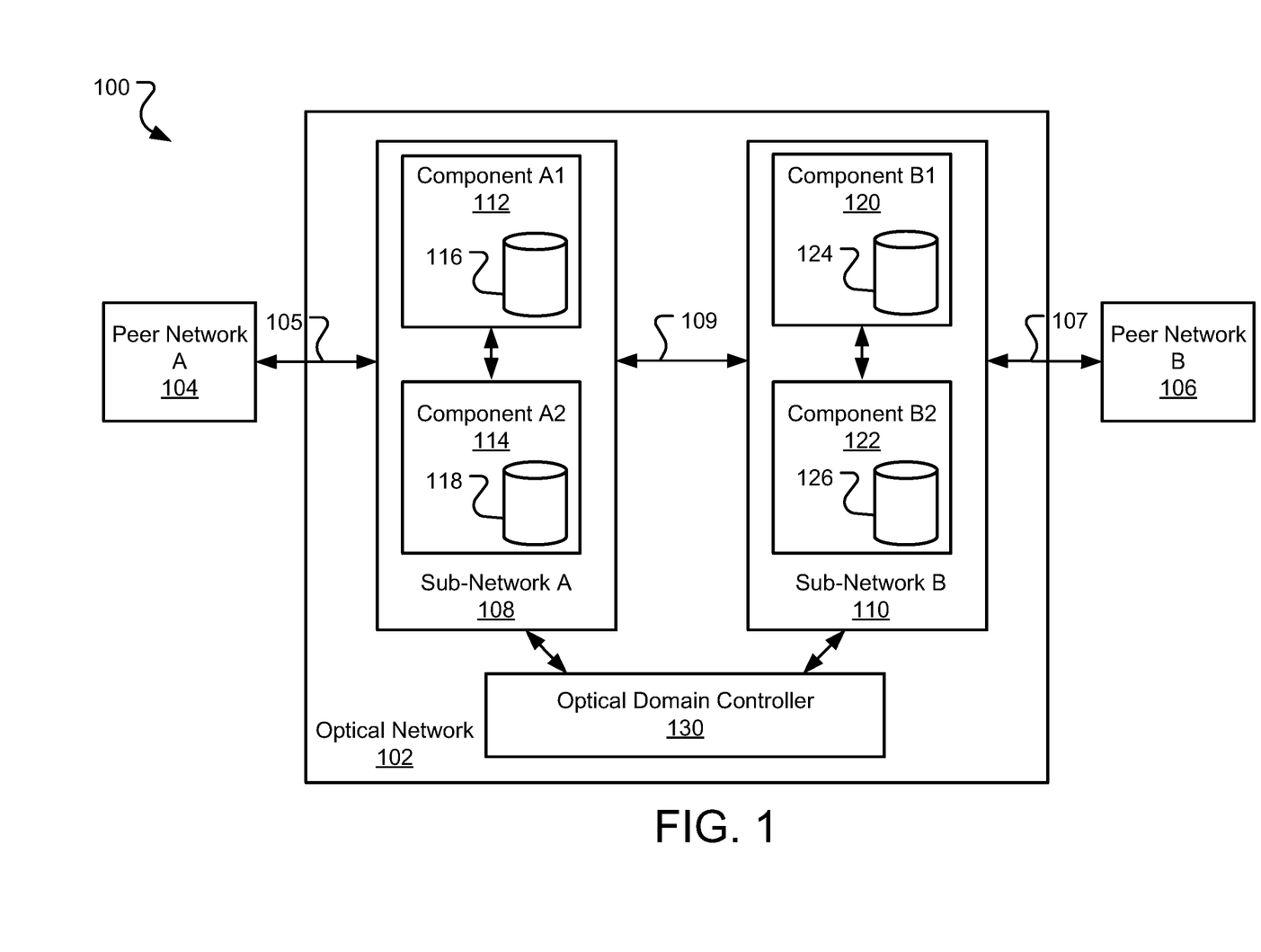
FIG. 1 is a schematic diagram illustrating a network operating environment for utilizing an optical domain controller to manage one or more optical network elements in accordance with one embodiment.

FIG. 1 is a schematic diagram illustrating a network operating environment 100 for utilizing an optical domain controller 130 to manage one or more optical network elements in accordance with one embodiment. The network operating environment 100 may include optical network 102 or backbone network that connects a first peer network 104 and a second peer network 106. The optical network 102 may be provided by a wholesale network service provider or other network provider. However, while the environment 100 of FIG. 1 shows a configuration using the optical network 102, it should be appreciated that portions of the network may include non-optical components, including any Internet Protocol (IP) networking devices.

In general, peer network A 104 and peer network B 106 connect to the optical network 102 via one or more optical fiber cables 105, 107 configured to transmit a large capacity of network traffic. Peer networks 104, 106 may include communication devices similar to those of optical network 102 for communicating with one or more customers to the peer network 104, 106. In general, the peer networks 104, 106 may include any type of communication or networking device that transmits or carries telecommunications or data signals via a network. In some instances, either peer network A 104 or peer network B 106 may request an interconnection to the other peer network via optical network 102. Thus, optical network 102 may provide devices and transmission lines over which traffic may be transmitted to and received from peer network A 104 and peer network B 106. The optical network 102 may include numerous components such as, but not limited to gateways, routers, route reflectors, and registrars, which enable communication and/or provides services across the optical network 102, but are not shown or described in detail here because those skilled in the art will readily understand these components.

In one particular example, the optical network 102 may include sub-network A 108 that includes optical component A1 112 and optical component A2 114. The sub-network A 108 may also be referred to as autonomous systems or autonomous devices of optical network 102. Component A1 112 may interconnect with component A2 114 for the transmission of information, communications, and data between the components 112, 114. Further, sub-network A 108 may connect to peer network A 104 to receive or transmit communications and information from optical network 102 to peer network A 104. For example, component A1 112 may receive communications from peer network A 104 for transmission to peer network B 106 via optical network 102. In one particular example, sub-network A 108 may be an optical switch or optical cross-connect device for interconnecting optical signals received at the sub-network components 112, 114. Component A1 112 may, in some instances, transmit the received communication to component A2 114 and vice versa. The combination of component A1 112 and component A2 114 may provide sub-network A 108 with particular features, such as redundancy of traffic paths through sub-network A 108, protection protocols on received communications, and the like. In some examples, component A1 112 and component A2 114 may be embodied within a single networking device, such as an optical switch of optical network 102. In other examples, component A1 112 and component A2 114 may be included in separate network devices that are interconnected to create sub-network A 108. Also, component A1 112 may include a database 116 for storing data associated with the component 112, such as configuration information and operational state information of component A1 112. The database 116 may also store configuration and/or operational state information of component A2 114, as discussed in more detail below. Component A2 114 may include a similar database 118 for storing configuration and/or operational state information of component A2 114 and/or component A1 112. Although only two components 112, 114 are illustrated in FIG. 1 associated with sub-network A 108, it should be appreciated that sub-network A 108 may include any number of components, programs, logic, circuits, interfaces, ports, etc.

The optical network 102 may also include sub-network B 110. Sub-network B 110, similar to sub-network A 108, may include component B1 120 and component B2 122, in addition to other components, programs, circuits, etc. not illustrated in FIG. 1. Component B1 120 may be in communication with component B2 122 of sub-network B 110 to provide transmission features to communications received at sub-network B 110, such as path redundancy and protection protocols. Further, sub-network B 110 may connect to peer network B 106 to receive or transmit communications and information from optical network 102 to peer network B 106. For example, component B1 120 or component B2 122 may receive communications from peer network B 106 and, in some instances, transmit the received communication to the other components of the sub-network 110. Also, sub-network B 110 may be connected to sub-network A 108 within optical network 102 via connection 109 such that communications may be shared between sub-networks 108, 110. In this manner, communications received from either peer network 104, 106 may be transmitted to the other peer network via sub-network A 108 and sub-network B 110. Also similar to the components 112, 114 of sub-network A 108, component B1 120 may include database 124 and component B2 122 may include database 126. The databases 124, 126 of sub-network B 110 may store configuration and operational status information from each of the components of the sub-network B 110. Although two sub-networks of the optical network 102 are illustrated, the optical network 102 may include hundreds or thousands of such sub-networks for transmitting optical signals via the optical network 102. Two such sub-networks are illustrated in FIG. 1 for simplicity and should not be considered limiting to the present disclosure.

In general, components within a sub-network may communicate or share information via a communication protocol supported by the respective sub-network. For example, component A1 112 and component A2 114 of sub-network A 108 may share configuration information, communications, traffic data, operational states, and the like for storage in the respective databases 116, 118. The transmission of data between the components 112, 114 of sub-network A 108 may be in the form of a particular communication protocol supported by the components of the sub-network 108. Similarly, component B1 120 and component B2 122 of sub-network B 110 may share configuration information, communications, traffic data, operational states, and the like for storage in the respective databases 124, 126. The transmission of data between the components 120, 122 of sub-network B 110 may be in the form of a different communication protocol than that used by the components 112, 114 of sub-network A 108. However, in some instances the information or data of sub-network A 108 is in the form of a communication protocol that is potentially not supported by the components sub-network B 110 such that information may not be shared between the sub-networks 108, 110. As such, sub-network A 108 may not receive configuration information or data concerning sub-network B 110, and vice versa.

To provide for inter-network configuration of sub-network A 108 and sub-network B 110, the optical network 102 may include an optical domain controller 130 in communication with sub-network A 108 and sub-network B 110. The optical domain controller 130 may be a system of devices within the optical network 102 configured to receive and manage configuration information and/or operational state information from sub-networks 108, 110 of the optical network 102. Additional features and operations of the optical domain controller 130 are described in more detail below. For example, the optical domain controller 130 may communicate with sub-network A 108 utilizing a communication protocol supported by sub-network A 108 and may communicate with sub-network B 110 utilizing a different communication protocol supported by sub-network B 110. Additional sub-networks of the optical network 102 may utilize other communication protocols, which may also be supported and utilized by the optical domain controller 130. In general, the optical domain controller 130 may store and use any communication protocols supported by client sub-networks to the controller. The optical domain controller 130 may also receive and store configuration and operational state information from the sub-networks 108, 110, configure or manage transmission paths between sub-networks, configure and manage transmission paths within sub-networks, and the like, as explained in more detail below.

Figure 2:
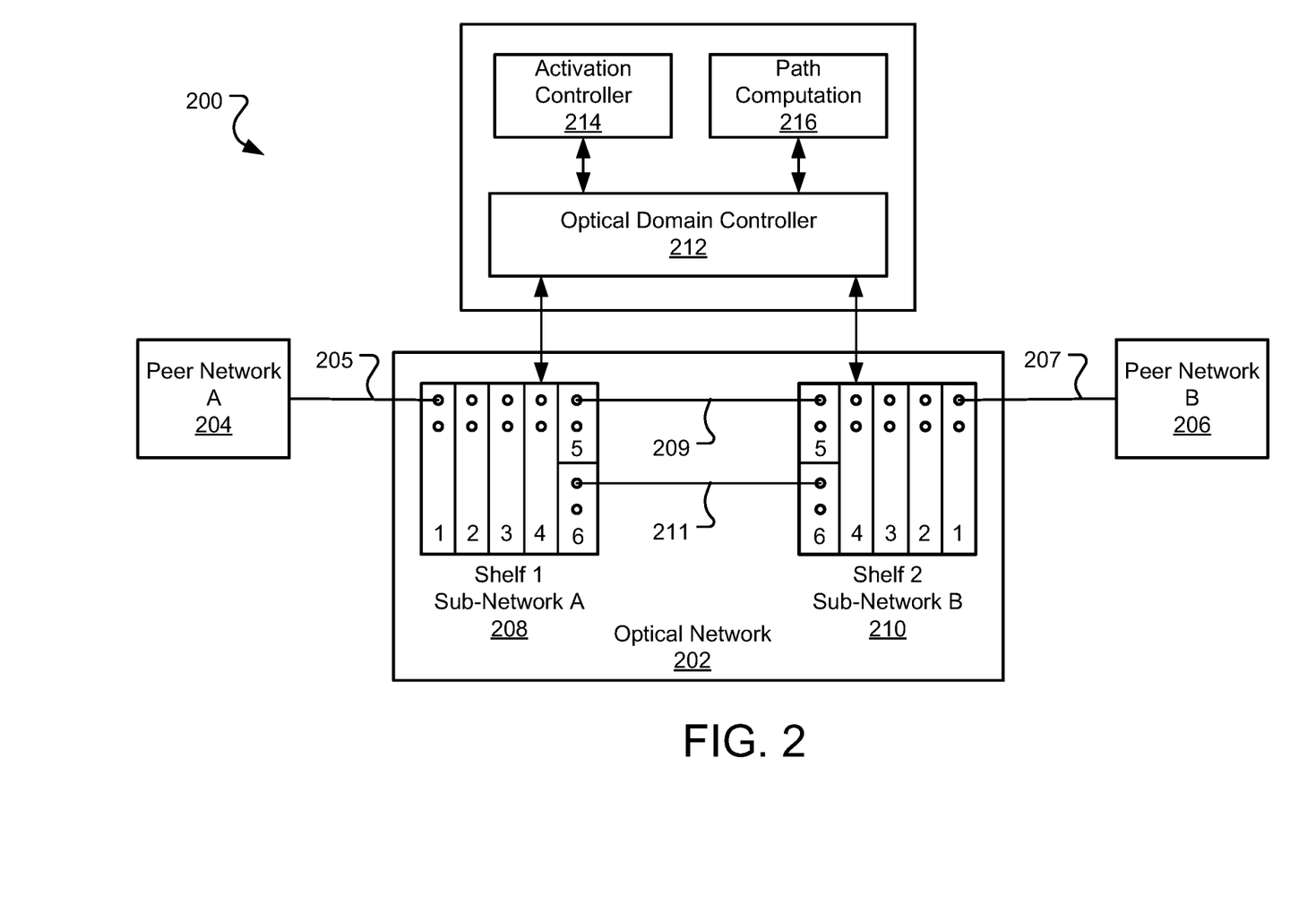
FIG. 2 is a schematic diagram illustrating a second network operating environment for utilizing an optical domain controller in a network environment in accordance with one embodiment.

FIG. 2 is a schematic diagram illustrating a second network operating environment 200 for utilizing an optical domain controller 212 in an optical network 202 in accordance with one embodiment. Many components of the network environment 200 of FIG. 2 are similar to those discussed above in relation to FIG. 1. For example, the network environment 200 may include a first peer network 204 and a second peer network 206 connected or otherwise in communication with optical network 102. Peer network A 204 and peer network B 206 may utilize optical network 202 to provide an optical interconnection service between the peer networks 204, 206. In particular, peer network A 204 may connect to sub-network A 208 via a first optical fiber cable 205 and peer network B 206 may connect to sub-network B 210 via a second optical fiber cable 207. The optical network 202 may receive a service request to interconnect peer network A 204 and peer network B 206 and, utilizing sub-network A 208 and sub-network B 210 of the optical network 202, may instantiate the service. In some examples, sub-network A 208 may be located in a first geographic location and sub-network B 210 may be located in a separate geographic location. Additional network components or sub-networks may be utilized to connect the sub-networks 208, 210, although such components are omitted in FIG. 2 for clarity.

The sub-networks 208, 210 of the optical network 202 of FIG. 2 provide more detail of the connection of the sub-networks to other components or networks. For example, sub-network A 208 is illustrated as an optical switch shelf including six slots within the shelf. Each slot includes two ports or interfaces for connection to one or more optical fibers. Each interface of the optical switch shelf may be considered or referred to as a component of the optical switch and may be indexed with an identification number or address corresponding to a shelf number, a slot number, and a port number. For example, sub-network A 208 may be associated with a shelf index number of 1 and sub-network B 210 may be associated with a shelf index number of 2. The component interfaces of slot 1 of shelf 1 208 may therefore be indexed by a port address of 1-1-1 corresponding to shelf 1, slot 1, and interface 1 and 1-1-2 corresponding to shelf 1, slot 1, and interface 2. Similarly, the component interfaces of slot 1 of shelf 2 210 may therefore be indexed by a port address of 2-1-1 corresponding to shelf 2, slot 1, and interface 1 and 2-1-2 corresponding to shelf 2, slot 1, and interface 2. It should be appreciated that these are simplified examples of port addressing or indexing utilized in an optical network and those of ordinary skill in the art will understand the various types and formats of interface addresses utilized by optical networking equipment or devices. However, this simplified addressing scheme is used herein for reference to the operation of the optical network 202 and the optical domain controller 212.

As illustrated, peer network A 204 may connect to sub-network A 208 via fiber cable 205 at port interface 1-1-1 for interconnection to other components or sub-networks of the optical network 202. Similarly, peer network B 206 may connect to sub-network B 210 via fiber cable 207 at port interface 2-1-1 for interconnection to other components or sub-networks of the optical network 202. Further, a request from peer network A 204 may be received at the optical network 202 to connect to peer network B 206 via the optical network. In previous network configurations, a network operator or controller may consult a network configuration database to determine an available route path between sub-network A 208 and sub-network B 210 to provide an interconnection between peer network A 204 and peer network B 206. Once verified with the network configuration database, a service activator may be used to configure connections, ports, or network devices to provide the service in response to the received service request.

In the embodiment illustrated in FIG. 2, an optical domain controller 212 may be utilized by the optical network 202 to instantiate the requested interconnection service in the optical network 202. The optical domain controller 212 may be a portion of the optical network 202 or may be separate, but in communication with, the optical network 202. As explained in more detail below, the optical domain controller 212 may communicate with other network configuration and management devices or systems, such as a service activation controller 214 and/or a path computation device 216. Further, the optical domain controller 212 may communicate with sub-network A 208 and/or sub-network B 210 to instantiate the requested interconnection service. In some instances, such communications may be in multiple communication formats or schemes supported by the respective sub-network 208, 210. The optical domain controller 212 may also configure one or more existing services in response to a change to a provided service. The operations and systems of the optical domain controller 212 are described below with reference to FIGS. 3-5.

Figure 3:
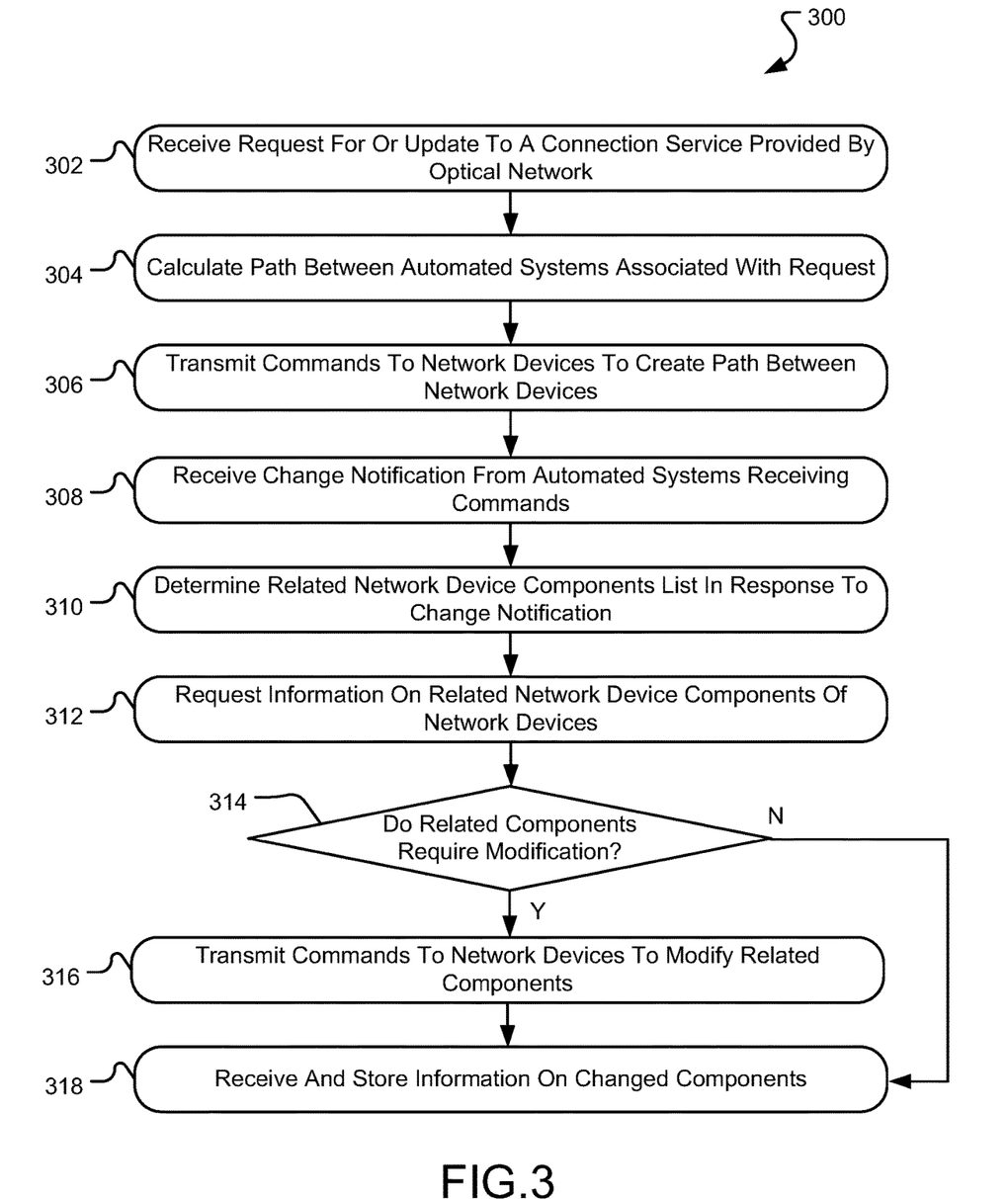
FIG. 3 is a flowchart of a method for maintaining and updating optical network element configurations utilizing an optical domain controller in accordance with one embodiment.

FIG. 3 is a flowchart of a method 300 for maintaining and updating optical network element configurations utilizing an optical domain controller 212 in accordance with one embodiment. The operations of the method 300 may be performed or executed by the optical domain controller 212 discussed herein. In some instances, the operations may be performed via one or more hardware components of the optical domain controller 212, one or more software programs of the optical domain controller, or a combination of both hardware and software components. Further, one or more of the operations may be performed by other network elements of the optical network 202 or associated with the optical network.

Beginning in operation 302, the domain controller 212 may receive a request for a connection service provided by an optical network 202 or an update to an existing connection service. For example and using the network environment 200 of FIG. 2, peer network A 204 may transmit a request to the domain controller 212 to provide a connection, via optical network 202, to peer network B 206. In operation 304, the optical domain controller 212 may determine or obtain a transmission path through optical network 202 in response to the requested connection service. For example, optical domain controller 212 may communicate with a path computation device 216 to determine the sub-networks 208, 210 and/or other networking devices for connecting peer network A 204 to peer network B 206. The path computation device 216 may maintain or obtain network configuration information to determine the affected sub-networks of the optical network 202 for providing the service, such as sub-network A 208 and sub-network B 210. In one example, such network configuration information may be obtained from the sub-networks 208, 210 included in a path through a self-reporting procedure in which each sub-network provides connection information, port and device state information, operating system information, and the like either automatically or in response to a request to the optical domain controller 212 and/or path computation device 216 such that a current state and configuration of the devices of the optical network 202 may be obtained and stored. In this manner, the optical domain controller 212 and/or the path computation device 216 may determine the sub-networks and devices of the optical network 202 for providing the requested connection service.

Using the environment 200 of FIG. 2 as an example, the optical domain controller 212 may determine a connection of peer network A 204 to optical network 202 at component interface 1-1-1 of sub-network A 208. Similarly, the optical domain controller 212 may determine a connection of peer network B 206 to optical network 202 at component interface 2-1-1 of sub-network B 210. Each sub-network 208, 210 or shelf may include a backplane component or other internal connection mechanism such that signals received at an interface of the sub-network may be transmitted to or otherwise provided to other ports or interfaces of the sub-network. Further, the optical domain controller 212 may determine that sub-network A 208 is connected to sub-network B 210 of the optical network 202 via connection 209 and connection 211. Connection 209 may include a fiber cable component connecting interface 1-5-1 (shelf 1, slot 5, interface 1) of sub-network A 208 to component interface 2-5-1 (shelf 2, slot 5, interface 1) of sub-network B 210. Connection 211 may include a fiber cable component connecting component interface 1-6-1 (shelf 1, slot 6, interface 1) of sub-network A 208 to interface 2-6-1 (shelf 2, slot 6, interface 1) of sub-network B 210. With the interconnection information, the path computation device 216 or optical domain controller 212 may determine a path through optical network 202 that includes connection 205, connection 209, and connection 207. An alternate path through the network 202 may include connection 205, connection 211, and connection 207. It should be appreciated that the determine path may include many sub-networks, devices, connections, and the like associated with optical network 202 and the paths discussed herein are simplified for ease of understanding. The optical domain controller 212 and/or path computation device 216 may select from the multiple available transmission paths one transmission path to provide the requested connection service to peer network A 204. Such a selection of a preferred path from the multiple paths may be based on one or more business rules or considerations. For example, the selection of a transmission path from multiple possible transmission paths between the sub-networks 208, 210 may be based on shortest transmission distance, lowest cost to the optical network 202, one or more service agreements with the peer networks 204, 206, a quality of service for the requested connection, and the like.

Upon determination of the path between the sub-networks 208, 210, the optical domain controller 212 may, in operation 306, generate and transmit one or more configuration commands to the sub-networks 208, 210 to create the transmission path between the sub-networks. For example, the path computation device 216 may determine that connection 209 of the network environment 200 will be used to connect peer network A 204 to peer network B 206 via the optical network 202 and the sub-networks 208, 210. To provide the connection, component interfaces 1-1-1 and 1-5-1 may be configured with service parameters to provide a connection from peer network A 204 through sub-network A 208. The configurations to connect component interface 1-1-1 to 1-5-1 of sub-network A 208 may be provided by the optical domain controller 212. In one implementation, the optical domain controller 212 may utilize a service activation controller 214 in communication with the optical domain controller 212. The activation controller 214 may receive or obtain the selected path and configuration information of the affected sub-networks 208, 210 and generate the one or more configuration instructions for configuring the sub-networks 208. As explained in more detail below, the one or more configuration instructions may be generated in a common format that are translated into sub-network specific or supported communication formats for transmission to and execution by the targeted sub-network.

The one or more configuration instructions to interconnect interfaces within the sub-network 208 may include many configurations of the components or states of the sub-network 208. For example, the configuration instructions may cause sub-network A 208 to configure component interface 1-1-1 with aspects of an optical connection service, such as a transmission rate, a sub-channel setting, a transmission framing setting, a particular handoff scheme, and the like. In general, any configurable aspect of an optical component interface may be configured through the execution of the one or more configuration instructions. In addition, the configuration instructions may be executed to connect interface 1-1-1 to 1-5-1 along a backplane or other intra-device connection such that signals received at interface 1-1-1 may be transmitted to interface 1-5-1 via the sub-network A 208, and vice versa. In some instances, the configuration instructions may also configure interface 1-5-1 with one or more aspects of the connection service, similar to interface 1-1-1. Other configurations of sub-network A 208 may also be executed via the configuration instructions to accommodate the connection service request received from peer network A 204.

In a similar manner, one or more configuration instructions may be generated and transmitted to sub-network B 210 to configure the components or aspects of sub-network B 210 in response to the requested connection service. For example, component interface 2-5-1 and component interface 2-1-1 may be configured with connection parameters, such as transmission rate, sub-channel, framing, etc. Also, the configuration instructions may be provided by the optical domain controller 212 in a transmission or operating system format supported by the operating system of sub-network B 210. In general, any configurable aspect of sub-network B 210 may be altered, set, or adjusted in response to one or more configuration instructions transmitted to sub-network B 210 based on the determined transmission path to connect peer network A 204 and peer network B 206. Upon execution of the configuration instructions by sub-network A 208 and sub-network B 210, peer network A 204 may communicate with peer network B 206 over connection 205, connection 209, and connection 207 via optical network 202.

In operation 308, the optical domain controller 212 may receive a change notification from sub-network A 208 and/or sub-network B 210 in response to the change to the configuration of the respective sub-networks. For example, each sub-network 208, 210 of optical network 202 that is a client of the optical domain controller 212 may include an application or operation to notify the optical domain controller 212 when a change in configuration of the sub-network has occurred. Such change notification may be transmitted through any known or hereafter developed notification procedure, scheme, or language, such as telemetry language, netconf, Simple Network Management Protocol (SNMP), Command Line Interface (CLI), syslog, and the like. In one instance, the change notification transmitted by the sub-networks 208, 210 may be transmitted in an operating language supported by the respective sub-networks. The change notifications may include information about the changes to the configuration of the sending sub-network, such as a prior state of components of the sub-network, an ending state of the components, related components of the sub-network to the changed component or state, and the like. In other examples, however, the change notification may include an ending configuration state of the sub-network.

In some instances, the optical domain controller 212 may not determine a transmission path and generate and transmit the configuration instructions to the sub-networks 208, 210 of the optical network 202. Rather, the optical network 202 may instantiate a connection service in the network based on a request received from a client of the network, such as peer network A 204. In other words, peer network A 204 may initiate the service connection on the optical network 202 without involvement of the optical domain controller 212. An example of a system and method for providing an optical connection service to a client network of the optical network 202 is described in U.S. Provisional Patent Application 62/915,587, titled OPTICAL PEERING FABRIC IN A TELECOMMUNICATIONS NETWORK. In such instances, the optical domain controller 212 may operate similar to a master orchestrator by initiating one or more configuration commands based on a request received at the master orchestrator to connect participant sites, authenticating and/or authorizing the information and parties associated with the request, and providing configuration instructions or commands to the network devices in response to a request for a connection service received from a network connected to the optical network, such as peer network A 104. Regardless of the entity or device that instantiates the connection service on the optical network 202, the optical domain controller 212 may receive the change notification from the affected sub-networks 208, 210 associated with the implementation of the connection service. In circumstances in which the connection service is executed on the optical network 202 without the optical domain controller, operations 302-306 may not be performed by the optical domain controller and the method 300 of FIG. 3 may begin with operation 308 upon receiving the change notification from the altered sub-network 208.

In operation 310, the optical domain controller 212 may determine any services, components, devices, interfaces, and related to the elements included in the received change notification from the sub-network of the optical network 202. For example, based on network configuration information obtained from previously executed configuration instructions or from self-reporting applications executed by the sub-networks 208, 210, the optical domain controller 212 may determine that component interface 1-5-1 of sub-network A 208 is connected to component interface 2-5-1 of sub-network B 210. Intra-device relationships may also be determined by the optical domain controller 212. For example, the controller 212 may determine that interface 1-1-1 of sub-network A 208 may be connected to interface 1-5-1 and interface 1-6-1 of the sub-network A 208. In general, any component, device, connection, interface, etc. of a sub-network or network device that is related to a changed component or configuration as indicated in the received change notification may be determined by the optical domain controller 212. The controller 212 may, in some instances, obtain relationship information from a network configuration database populated by information received from devices of the network in response to a request for configuration information or transmitted automatically in response to changes to the configuration of the network devices. As discussed above, sub-networks 208, 210 of the optical network 202 may not store configuration or operational information of other sub-networks in the network 202. Therefore, optical domain controller 212 may, upon storing network configuration information, generate inter-device relationships for use in determining elements affected by a configuration change. For example, the optical domain controller 212 may generate and store an indication of connection 209 for interface 1-5-1 and interface 2-5-1 such that a change notification received associated with either interface may cause the controller 212 to determine a relationship with the other interface of the connection 209. In this manner, the optical domain controller 212 may determine both inter-device and intra-device relationships corresponding to a change notification received from a sub-network 208, 210 of the network 202.

In operation 312, the optical domain controller 212 may generate and transmit one or more status or state requests to the identified related elements of the sub-networks 208, 210 associated with the change notification. For example, the optical domain controller 212 may request configuration information for interface 1-5-1 from sub-network A 208 in response to the change notification received from sub-network A. The requested configuration information may include state information (such as active, used, inactive, etc.), transmission parameters associated with the interface (such as transmission rate, framing scheme, etc.), or any other configurable attribute of the interface. The optical domain controller 212 may also generate and transmit a similar status or state request to sub-network B 210 for interface 2-5-1 in relation to a change notification received from the sub-network B 210. Each sub-network 208, 210 may be configured to obtain status or state information of a component identified in the status request and return the component information. In this manner, the optical domain controller 212 may obtain configuration information of each component of the sub-networks 208, 210 altered or reconfigured in response to the connection service request executed on the optical network 202.

In operation 314, the optical domain controller 212 may determine if the related components of the affected sub-networks 208, 210 require configuration based on the received change notification. For example, the change notification received from sub-network A 208 may indicate that a transmission protocol of component interface 1-1-1 was changed, such as a change to the handoff procedure, transmission rate, sub-channel, framing scheme, etc. of the interface. Upon receiving the change notification and determining the interface 1-1-1 is connected to interface 1-5-1 via the sub-network A 208, the optical domain controller 212 may request and receive a configuration or state status of interface 1-5-1. The optical domain controller 212 may then compare the configuration of interface 1-1-1 to the configuration of 1-5-1 and determine if the configuration of interface 1-5-1 is to be altered to match the configuration of interface 1-1-1. Similarly, the optical domain controller 212 may determine that interface 1-5-1 is connected to interface 2-5-1 of sub-network B 210. Upon the determination, the optical domain controller 212 may request status or configuration information for interface 2-5-1 of sub-network B 210 and compare the interface configuration to the configuration of interface 1-5-1 of sub-network A 208. In this manner, the optical domain controller 212 may traverse the transmission path associated with the change notification to determine which elements along the transmission path may require additional configuration to ensure a proper provisioning of the connection service to the peer networks 204, 206.

If the related components to the change notification require alteration, the optical domain controller 212 may generate and transmit one or more configuration instructions or commands to the sub-networks associated with the noted components in operation 316. The configuration of the components may occur in a similar manner as described above, in some instances utilizing the activation controller 214 to generate the configuration instructions. The optical domain controller 212 may configure any number of components of the transmission path based on receiving a change notification from any sub-network 208, 210 of the optical network 202.

Upon modifying the related components or if no components of the transmission path is required to be modified, the optical domain controller 212 may receive and store configuration information and/or operational status information from the sub-networks 208, 210 of the transmission path in operation 318. The configuration and status information may be utilized by the optical domain controller 212 if additional service requests and/or change notifications are received at the optical domain controller. In this manner, the controller may detect changes to services instantiated in the optical network 202, modify the configuration of additional components related to the changes to the service, and maintain a current network configuration model, without relying on technicians or other devices related to the network to update the network database upon alterations to the network configuration.

Figure 4:
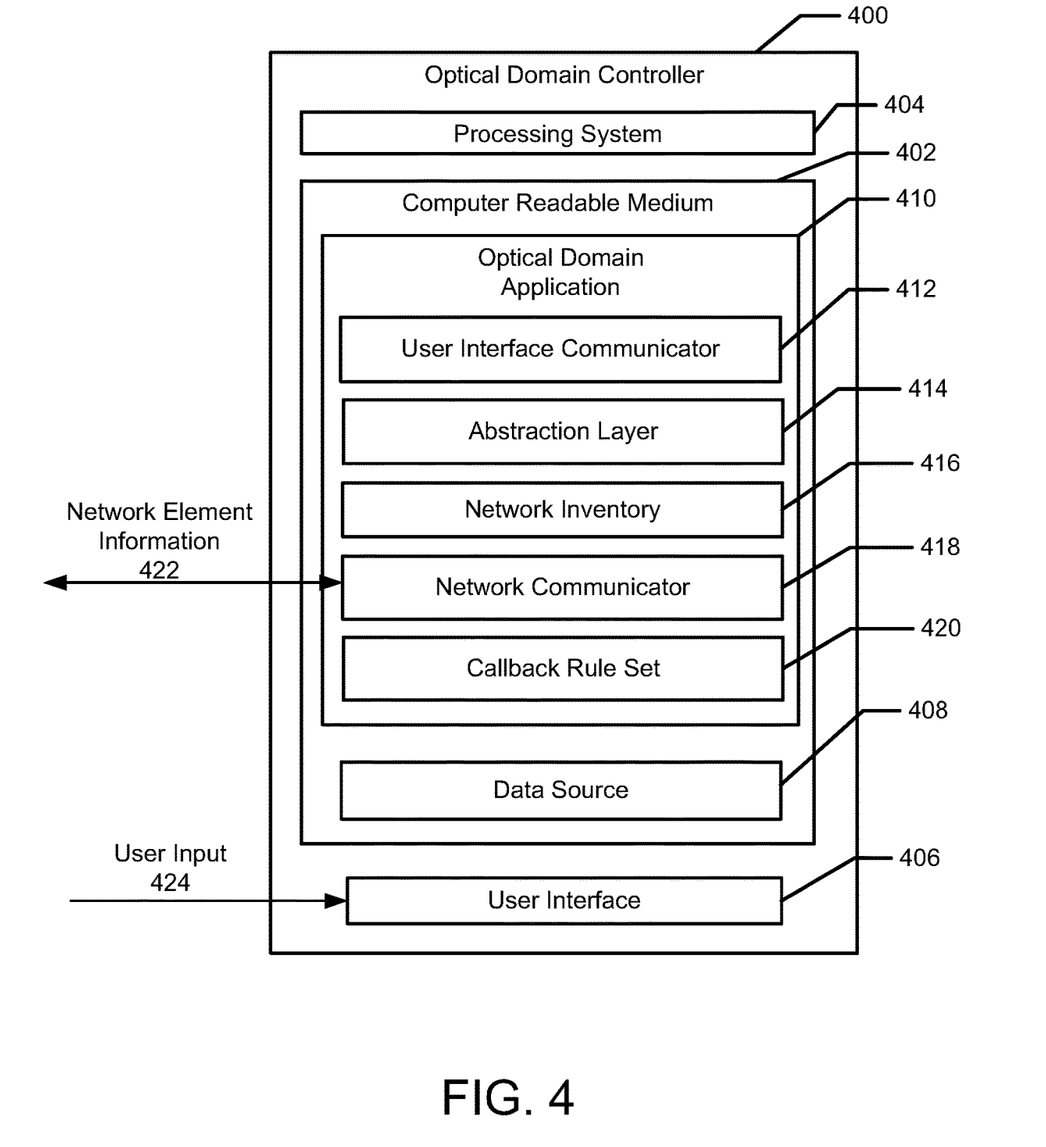
FIG. 4 is a schematic diagram illustrating an optical domain controller system for managing optical network devices of a communications network in accordance with one embodiment.

FIG. 4 is a schematic diagram illustrating an optical domain controller system 400 for managing optical network devices of a communications network in accordance with one embodiment. In some instances, an optical domain application 410 may be executed on the optical domain controller 400 to perform one or more of the operations described herein. The optical domain application 410 may be stored in a computer readable media 402 (e.g., memory) and executed on a processing system 404 of the optical domain controller 400 or other type of computing system, such as that described below. For example, the optical domain application 410 may include instructions that may be executed in an operating system environment, such as a Microsoft Windows™ operating system, a Linux operating system, or a UNIX operating system environment. The computer readable medium 402 includes volatile media, nonvolatile media, removable media, non-removable media, and/or another available medium. By way of example and not limitation, non-transitory computer readable medium 402 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the optical domain controller 400 also provides a user interface (e.g., a command line interface (CLI), a graphical user interface (GUI), etc.) 406 displayed on a display, such as a computer monitor, for displaying data. Through the user interface 406, a user of the optical domain controller 400 may provide user inputs 424 through one or more input devices. The user input 424 may be used by the optical domain controller 400 to, among other things, provide an optical connection service request for optically connecting a peer network to the optical network of the optical domain controller. The input device for providing the customer input 424 may include, among others, a keyboard or a pointing device (e.g., a mouse, trackball, pen, or touch screen) to enter data into or interact with the user interface 406.

In one example, the user interface 406 may communicate with other components in the optical domain application 410 to receive user input for manipulating or otherwise modifying the operation of the optical domain application 410. For example, user interface communicator 412 may communicate with user interface 406 to receive customer input 424 for use by the other components of the optical domain application 410. The user interface communicator 412 may also provide information to for display via the user interface 406, such as results of the connection service request. The optical domain application 410 may also utilize a data source 408 of the computer readable media 402 for storage of data and information associated with the optical domain controller 400. For example, the optical domain application 410 may store transmission path generation rules or decision trees, operating system configuration information for one or more components of the optical network, and the like. In general, any data or information utilized by the optical domain application 410 may be stored and/or retrieved via the data source 408.

The optical domain application 410 may include several components to perform one or more of the operations described herein. For example, an abstraction layer 414 may be included in the optical domain application 410 to convert communications, instructions, commands, and the like from a communication format utilized by one or more of the client devices of the optical domain controller 400 into a common communication format. For example, sub-network A 208 of FIG. 2 may utilize a first communication format based on the operating system of sub-network A 208 and sub-network B 210 may utilize a second communication format based on the operating system of sub-network B 210 that is different that the communication format of sub-network A. The abstraction layer 414 may maintain a map or translation table that associates commands received in the first and second format into a common format utilized by the optical domain application 410. This common format may be any format supported by the operating system of the optical domain application 410. In some examples, the abstraction layer 414 may translate particular commands, such as configuration commands, ignore connection commands, set port status commands, and the like between the common format and a particular communication format. In this manner, specific structures associated with sub-networks 208, 210 of the optical network 202 may be mapped or associated with a common structure. As explained above, the operations or instructions of the optical domain application 410 may be in the common structure for processing by the optical domain application 410.

The optical domain application 410 may also include a network inventory 416. The network inventory 416 may include network configuration information received from devices, sub-networks, and systems of the optical network 202. For example, sub-network A 208 may provide configuration information of the components of the sub-network, including interface configuration and inter-device connection information. The network inventory 416 may also store intra-device connection information, such as configuration information of connection 209 and connection 211. The intra-device connection information may be obtained during instantiation of optical connection services in the optical network 202. The network inventory 416 may be used by the optical domain application 410 when determining affected devices of a requested transmission path and to respond to requests for such connection provided by a peer network or other associated entity of the optical network 202.

A network communicator 418 may also be included with the optical domain application 410 to receive network element information 422 and transmit communications, instructions, and/or commands to elements within the optical network 202. The network element or device information 422 may be in a format supported by the target or sending network element. Further, the network communicator 418 may provide received network information to the abstraction layer 414 for translation into a common format. The network communicator 418 may also receive communications from the abstraction layer 414 for transmission to a target network element. The optical domain application 410 may also include a callback rule set 420 including rules for determining elements related to an instantiated or requested optical connection service. For example, the callback rule set 420 may include instructions or decisions trees that may be executed by the optical domain application 410 to trace elements associated with a change notification to determine which network elements are affected by the change notification. The callback rule set 420 may also include instructions or rules for comparing settings or configurations of elements to determine if adjustments to affected elements are required based on the change notification. In general, the operations executed by the optical domain application 410 in response to a change notification received from a device or sub-network of the optical network 202 may be included in the callback rule set 420.

It should be appreciated that the components described herein are provided only as examples and that the application 410 may have different components, additional components, or fewer components than those described herein. For example, one or more components as described in FIG. 4 may be combined into a single component. As another example, certain components described herein may be encoded on, and executed on other computing systems, such as on one remotely coupled to traffic controller 400.

Figure 5:
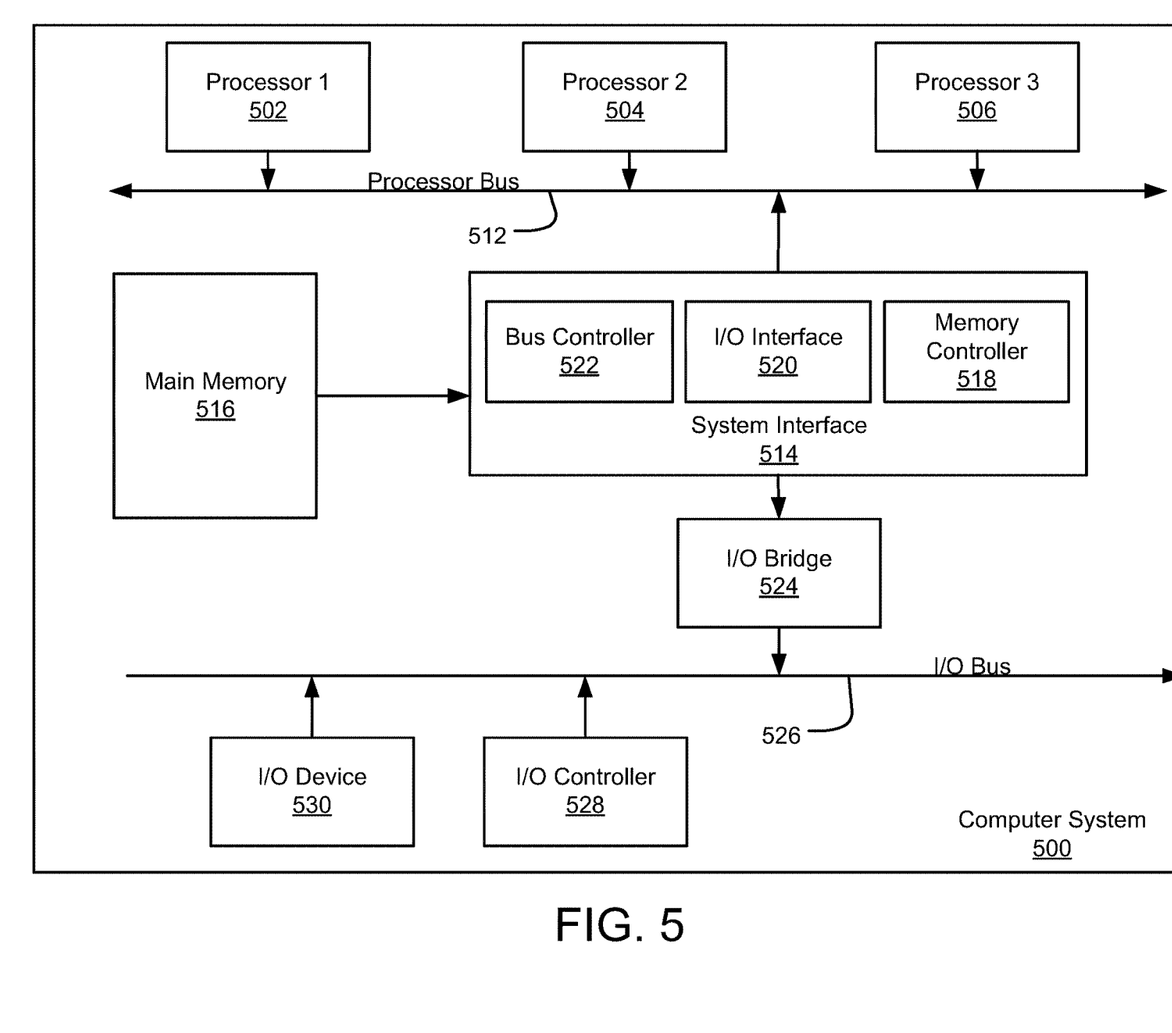
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the optical domain controller 130 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A system for managing a network, the system comprising:
    an optical domain controller in communication with a plurality of optical devices of an optical network, the optical domain controller:
    receiving, from a first optical device of the plurality of optical devices and in response to a request for an optical connection service, a notification of a configuration change to a component of the first optical device, the notification of the configuration change comprising a first communication format corresponding to an operating system of the first optical device;
    converting the notification of the configuration change to a common communication format different than the first communication format;
    obtaining, from a network infrastructure database, an identification of a component of a second optical device associated with the configuration change to the first optical device; and
    transmitting, to the second optical device, a configuration instruction to configure the component of the second optical device based on the notification of the configuration change to the first optical device.

2. The system of claim 1 wherein the configuration instruction comprises a second communication format different than the first communication format, the second communication format corresponding to an operating system of the second optical device.

3. The system of claim 1 wherein the optical domain controller is further:
    transmitting, to the first optical device and the second optical device, service connection instructions configuring an intra-device connection between the first optical device and the second optical device in response to the request for the optical connection service.

4. The system of claim 3 further comprising:
    a path computation device in communication with the optical domain controller, the optical domain controller further:
    obtaining, from the path computation device, the service connection instructions configuring the intra-device connection between the first optical device and the second optical device.

5. The system of claim 4 wherein the service connection instructions are based on a network business rule comprising a shortest connection path, a lowest cost connection path, or a quality of service threshold associated with a connection path.

6. The system of claim 1 wherein the first optical device comprises an optical cross-connect device and the component of the first optical device comprises a port interface of the first optical device.

7. The system of claim 1 wherein the notification of the configuration change to the first optical device comprises a notification of a change to at least one of a transmission rate of an interface, a sub-channel of the interface, or a framing setting of the interface.

8. The system of claim 1 wherein the configuration instruction to configure the component of the second optical device comprises a command to configure the component of the second optical device to match the configuration change to the component of the first optical device.

9. A method for managing a network, the method comprising:
    receiving, at an optical domain controller of an optical network, a configuration change notification from a first optical device of the optical network, the configuration change notification based on a request for an optical connection service of a first network to a second network via the optical network, and the configuration change notification comprising a first communication format corresponding to an operating system of the first optical device;
    converting the notification of the configuration change to a common communication format different than the first communication format;
    accessing a network infrastructure database storing configuration information of the optical network to determine a network component associated with the configuration change to the first optical device, the network component separate from the first optical device;
    generating a configuration instruction to configure the network component based on the configuration change notification from the first optical device; and
    transmitting, to an activation controller associated with the network component, the configuration instruction.

10. The method of claim 9 further comprising:
    receiving, at the optical domain controller and from a device associated with the first network, the request for the optical connection service of the first network to the second network via the optical network.

11. The method of claim 10 further comprising:
transmitting, to a network path computation device, a request for a network path via the optical network based on the request for the optical connection service; and
receiving, in response to the request for the network path, an indication of the first optical network device and a second optical network device comprising the network path.

12. The method of claim 11 further comprising:
transmitting, to the first optical network device and the second optical network device, service connection instructions configuring an intra-device connection between the first optical device and the second network device based on the indication of the first optical device and the second optical device.

13. The method of claim 12 wherein the service connection instructions are based on a network business rule comprising a shortest connection path, a lowest cost connection path, or a quality of service threshold associated with a connection path.

14. The method of claim 9 wherein the configuration instruction comprises the common format, the method further comprising:
converting the configuration instruction to a second communication format different than the common format, the second communication format corresponding to an operating system of the second optical device.

15. An optical domain controller of an optical network, the domain controller comprising:
a communication port communicating with a database of configurations of an optical network;
a processor in communication with the communication port to receive configurations of an optical network; and
a non-transitory memory comprising instructions encoded thereon, the instructions, when executed by the processor, are operable to:
receive configuration change notification from a first optical network device of the optical network, the configuration change notification based on a request for an optical connection service of a first network to a second network via the optical network, and the configuration change notification comprising a first communication format corresponding to an operating system of the first optical device;
convert the notification of the configuration change to a common communication format different than the first communication format;
determine, based on the received configurations of an optical network, a network component associated with the configuration change to the first optical network device, the network component separate from the first optical network device;
transmit, to a second optical network device associated with the network component, a configuration instruction to configure the network component based on the configuration change notification from the first optical network device.

16. The optical domain controller of claim 15 wherein the instructions are further operable to:
convert the configuration instruction to a second communication format different than the common format, the second communication format corresponding to an operating system of the second optical network device.

17. The optical domain controller of claim 15 wherein the instructions are further operable to:
transmit, to the first optical network device and the second optical network device, service connection instructions configuring an intra-device connection between the first optical network device and the second optical network device in response to the request for the optical connection service.

18. The optical domain controller of claim 15 wherein the request for the optical connection service is received from a computing device associated with the first network, the first network connected to the first optical network device and wherein the instructions are further operable to:
authenticate the computing device as associated with the first network; and
generate service connection instructions configuring an intra-device connection between the first optical device and the second network device.

* * * * *